(12) United States Patent
Mochizuki et al.

(10) Patent No.: US 8,670,296 B2
(45) Date of Patent: Mar. 11, 2014

(54) OPTICAL INFORMATION RECORDING MEDIUM AND OPTICAL INFORMATION RECORDING METHOD

(71) Applicant: Fujifilm Corporation, Tokyo (JP)

(72) Inventors: Hidehiro Mochizuki, Odawara (JP); Toshio Sasaki, Odawara (JP); Toshiyuki Kitahara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/714,645

(22) Filed: Dec. 14, 2012

(65) Prior Publication Data

US 2013/0100791 A1    Apr. 25, 2013

Related U.S. Application Data

(63) Continuation of application No. PCT/JP2011/064673, filed on Jun. 27, 2011.

(30) Foreign Application Priority Data

Jul. 13, 2010    (JP) .................................. 2010-158581

(51) Int. Cl.
*G11B 7/24035* (2013.01)
*G11B 7/0055* (2006.01)

(52) U.S. Cl.
USPC ............ 369/284; 369/280; 369/100; 369/288

(58) Field of Classification Search
USPC ........... 369/288, 284, 100, 275.3, 275.2, 280, 369/83
See application file for complete search history.

(56) References Cited

U.S. PATENT DOCUMENTS

| | | | |
|---|---|---|---|
| 5,472,929 A * | 12/1995 | Inoue et al. | 503/204 |
| 5,800,950 A * | 9/1998 | Hirao et al. | 430/1 |
| 6,483,735 B1 * | 11/2002 | Rentzepis | 365/119 |
| 2009/0097377 A1 * | 4/2009 | Salomon et al. | 369/100 |
| 2010/0110858 A1 | 5/2010 | Iwamura et al. | |
| 2010/0182895 A1 * | 7/2010 | Oyamada et al. | 369/284 |

FOREIGN PATENT DOCUMENTS

| | | | |
|---|---|---|---|
| JP | 2004-347642 A | 12/2004 | |
| JP | 2005-037658 A | 2/2005 | |
| JP | 2009-170013 A | 7/2009 | |
| JP | 2010-086568 A | 4/2010 | |
| JP | 2010-122373 A | 6/2010 | |

OTHER PUBLICATIONS

Day, Daniel, et al., "Formation of Voids in a Doped Polymethylmethacrylate Polymer," Applied Physics Letter, Apr. 1, 2002, pp. 2404-2406, vol. 80, No. 13.

(Continued)

*Primary Examiner* — Wayne Young
*Assistant Examiner* — Dionne Pendleton
(74) *Attorney, Agent, or Firm* — Sughrue Mion, PLLC

(57) ABSTRACT

An optical information recording medium includes: a recording layer 12 comprising a multi-photon absorption compound and a one-photon absorption compound; and a supporting member (base layer 11) configured to support the recording layer 12. In this optical information recording medium, absorption of multiple photons by the multi-photon absorption compound and absorption of one photon by the one-photon absorption compound cause a void to be generated in the recording layer, whereby information is recordable by modulation based on a presence or absence of a void.

10 Claims, 1 Drawing Sheet

(56) References Cited

OTHER PUBLICATIONS

Shiono, Teruhiro, et al., "Two-Photon Absorption Recording in Photochromic Diarylethenes Using Laser Diode for Three-Dimensional Optical Memory," Japanese Journal of Applied Physics, May 24, 2005, pp. 3559-3563, vol. 44, No. 5B.

International Search Report for PCT/JP2011/064673, dated Aug. 30, 2011.

Notification of Reasons for Refusal, dated Aug. 6, 2013, issued in corresponding JP Application No. 2010-158581, 4 pages in English and Japanese.

* cited by examiner

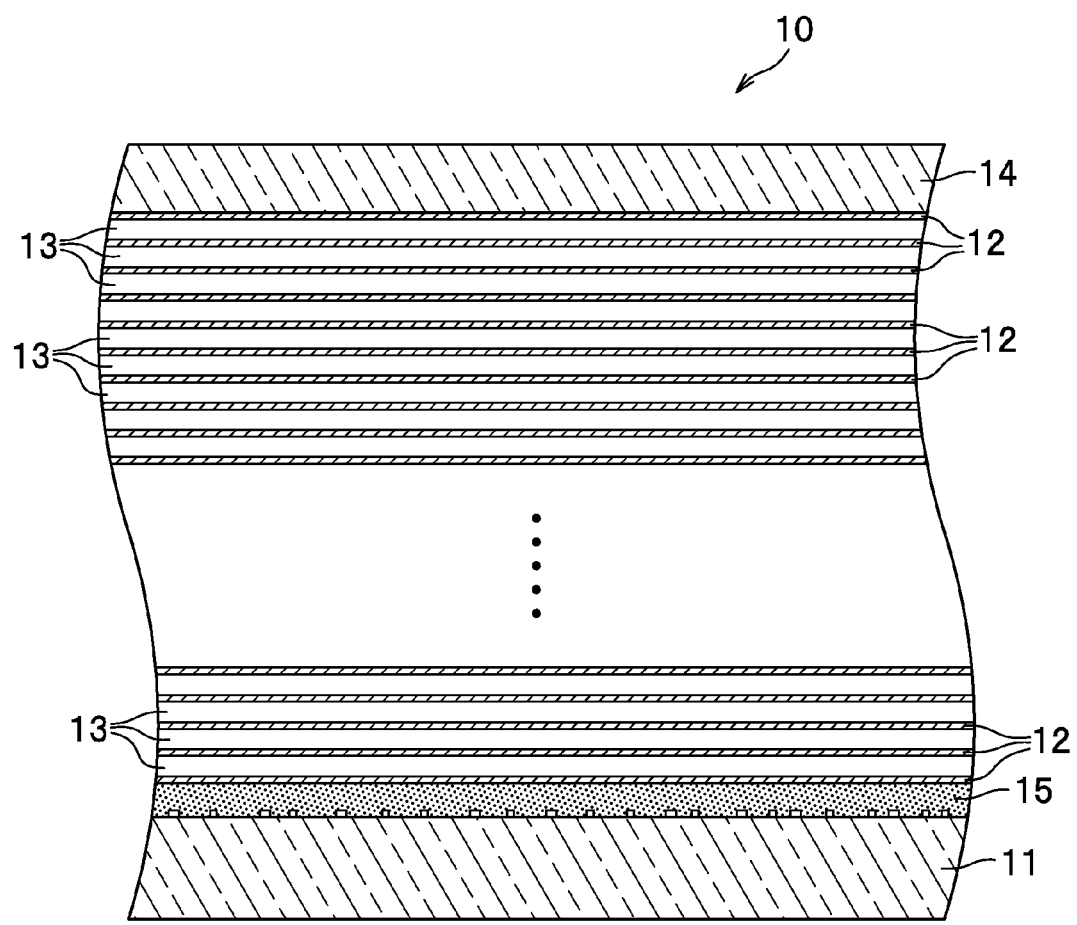

OPTICAL INFORMATION RECORDING MEDIUM AND OPTICAL INFORMATION RECORDING METHOD

CROSS-REFERENCE TO RELATED APPLICATION(S)

This application is a continuation application of International Application No. PCT/JP2011/064673 filed on Jun. 27, 2011, which claims priority to Japanese Patent Application No. 2010-158581 filed on Jul. 13, 2010, the disclosures of which are incorporated herein by reference in their entity.

TECHNICAL FIELD

The present invention relates to an optical information recording medium, which is illuminated with light to produce voids for recording information, and an optical information recording method for recording information on the optical information recording medium.

BACKGROUND ART

In order to increase recording capacity of an optical information recording medium, attempts have been made on the optical information recording medium for laminating recording layers into a multi-layered structure. As optical information recording media which have been put into practical use for recording information in a plurality of recording layers, write-once digital versatile disks (DVDs) and write-once Blu-ray discs (registered trademark) are already known. However, these media use a one-photon absorption material in the recording layers, with the result that there is a low layer selectivity for causing only a particular recording layer to react upon recording and further that when a far side recording layer is recorded as viewed from a recording beam radiation side, the recording beam is absorbed by near side recording layers. This disadvantageously results in a large loss of the recording beam.

Accordingly, in recent years, attempts have been made to use a multi-photon absorption reaction for the multilayer optical recording medium, in which a reaction occurs only at a limited region in a depth direction upon irradiation of the recording beam, for the purpose of increasing the layer selectivity upon recording while advancing multi-layering (see, for example, Patent Literature 1, Patent Literature 2, and Non-patent Literature 1). Multi-photon absorption reaction is a reaction of absorbing photons which takes place when a recording layer is given a plurality of (e.g., two) photons substantially simultaneously. For example, in a two-photon absorption reaction, light is absorbed proportionally to the square of the intensity of the light, so that the reaction takes place only at a position near the focal point of a beam where the intensity of the light is relatively high, and if a recording beam having a wavelength which does not cause one-photon absorption is used, the near side recording layers allow the recording beam to pass through without causing one-photon absorption. This is advantageous to achieve multi-layering of the recording layer.

CITATION LIST

Patent Literature

Patent Literature 1: Japanese laid-open patent application publication No. 2005-037658
Patent Literature 2: Japanese laid-open patent application publication No. 2009-170013

Non Patent Literature

Non-patent Literature 1: Daniel Day and Min Gu, Appl. Phys. Lett. 80, 13 (2002)

SUMMARY OF THE INVENTION

Technical Problem

However, multi-photon absorption compounds are poor in the light (multi-photon) absorption efficiency and thus lower in the recording sensitivity than one-photon absorption compounds which have been widely and practically used as a recording material for the optical information recording medium. Such a lower recording sensitivity is not preferable because this leads to decreased recording speed.

In view of the above, it is an object of the present invention to improve the recording sensitivity of an optical information recording medium even if the recording medium utilizes a multi-photon absorption reaction.

Solution to Problem

To solve the aforementioned problem, an optical information recording medium according to the present invention comprises: a recording layer comprising a multi-photon absorption compound and a one-photon absorption compound; and a supporting member configured to support the recording layer. In this optical information recording medium, absorption of multiple photons by the multi-photon absorption compound and absorption of one photon by the one-photon absorption compound cause a void to be generated in the recording layer, whereby information is recordable by modulation based on a presence or absence of a void.

With this configuration of the optical information recording medium, because the recording layer includes a multi-photon absorption compound and a one-photon absorption compound, absorption of energy by the one-photon absorption reaction occurs in a recording position in addition to absorption of energy by the multi-photon absorption reaction. The absorption of energy by these reactions causes a void to generate, and information is recordable by modulation based on the presence or absence of a void. Utilizing the multi-photon absorption reaction and the one-photon absorption reaction makes it possible to improve the recording sensitivity as compared to an optical information recording medium in which the recording material in the recording layer contains the multi-photon absorption compound only. Therefore, the recording speed is improved. Further, because the absorption ratio of the one-photon absorption compound is made lower as compared to an optical information recording medium in which the recording material in the recording layer contains the one-photon absorption material only, the selectivity of layers during the recording is improved and the loss of the recording beam due to the one-photon absorption is made smaller as compared to the optical information recording medium only containing the one-photon absorption compound in the recording layer.

In the aforementioned optical information recording medium, at least one of the multi-photon absorption compound and the one-photon absorption compound may be a foamable material which generates a void when it absorbs light and temperature thereof increases.

In addition to the multi-photon absorption compound and the one-photon absorption compound, the recording layer may comprise a vaporizable material which generates a void when the multi-photon absorption compound and the one-photon absorption compound absorb light and temperature of the vaporizable material increases.

Further, it is preferable that the recording layer comprises a polymer binder, and voids in the recording layer are erasable by heating. The polymer binder increases its fluidity when heated, so that voids are not retained in the polymer binder and thus disappear to erase the information.

Further, in order to obtain higher information recording density as well as to be able to stably read out information, it is preferable that the size of voids to be generated is in the range of 0.01 to 10 μm, and that the thickness of the recording layer is in the range of 0.01 to 10 μm.

In the aforementioned optical information recording medium, it is preferable that the recording layer comprises a plurality of recording layers. Further, the optical information recording medium may further comprise an intermediate layer provided between each of two adjacent recording layers. The intermediate layer is unreactive, with respect to one-photon absorption and multi-photon absorption, to irradiation of a recording beam for recording information and irradiation of a reading beam for reading out the information.

Providing an intermediate layer between two adjacent recording layers prevents crosstalk across the recording layers. Further, because the intermediate layer does not substantially undergo one-photon absorption and multi-photon absorption reactions to the recording beam or the reading beam, the loss of the recording beam and the reading beam is prevented and the signal-to-noise ratio is improved upon recording and reading out the information.

Further, it is preferable that the plurality of recording layers have an absorption ratio of one-photon absorption for the recording beam equal to or less than 5% per one layer.

Accordingly, if each of the recording layers is configured such that the absorption ratio of one-photon absorption for the recording beam is smaller, the loss of the recording beam during recording is suppressed and the number of the recording layers is increased to thereby achieve high-capacity recording.

To solve the aforementioned problem, according to the present invention, there is provided a method for recording optical information in an information recording medium, which comprises a recording layer including a multi-photon absorption compound and a one-photon absorption compound, and a supporting member configured to support the recording layer. The method comprises the step of: illuminating the recording layer with a pulsed laser beam modulated in accordance with information to be recorded in the recording layer, so as to cause a multi-photon absorption reaction in the multi-photon absorption compound and a one-photon absorption reaction in the one-photon absorption compound to take place to generate voids at positions determined corresponding to the modulation, whereby the information is recorded by modulation based on a presence or absence of a void.

Accordingly, illuminating the recording layer with a pulsed laser beam modulated in accordance with information and generating the multi-photon absorption reaction and the one-photon absorption reaction simultaneously in the recording layer of the optical information recording medium makes it possible to form recording spots with a recording sensitivity higher than that of a recording method only utilizing a multi-photon absorption reaction.

In the aforementioned optical information recording medium including a polymer binder contained in the recording layer, information once recorded in the recording layer is erasable. Specifically, a method for erasing information recorded in the aforementioned optical information recording medium comprises the step of: heating the recording layer, whereby the information recorded in the recording layer is erased.

This step renders the polymer binder incapable of retaining the voids, so that the voids disappear and the information recorded in the recording layer is erased. This allows repeated recording of the optical information recording medium.

When heating the recording layer, the recording layer may be irradiated with a continuous-wave laser beam while bringing the laser beam into focus on the recording layer. Irradiation of the continuous-wave laser beam causes a particular recording layer to be heated with the help of heat generated by light absorption of a (one-photon absorption) dye contained in the recording layer. Further, heating with the continuous-wave laser beam makes it possible to evenly erase the information recorded in a continuous region within the recording layer.

When heating the recording layer to erase the information, the optical information recording medium as a whole may be heated, whereby all the information recorded in the recording layer is erased. Accordingly, all the information recorded in the optical information recording medium is easily deleted for initialization. Further, when the optical information recording medium is disposed of, the information is easily deleted.

Other aspects and advantages of the present invention will become apparent from the following description taken in conjunction with the accompanying drawings.

BRIEF DESCRIPTION OF THE DRAWING

FIG. 1 is a sectional view of a multi-layered optical recording medium.

DESCRIPTION OF EMBODIMENTS

One exemplified embodiment of the present invention will be described below with reference to the drawings.

As seen in FIG. 1, a multi-layered optical recording medium 10 as an example of an optical information recording medium includes a base layer 11 as an example of a supporting member, a large number of recording layers 12 and intermediate layers 13 stacked on the base layer 11, and a cover layer 14 covering a side opposite to that at which the base layer 11 is provided. A servo layer 15 used for tracking servo is provided between the base layer 11 and the undermost recording layer 12. The overall shape of the multi-layered optical recording medium 10 is not limited to a specific shape and any other shape such as a disc-shape and a card-shape may be used where necessary.

The base layer 11 functions as a supporting member for the multi-layered optical recording medium 10 and may be a relatively thick basal plate having a thickness approximately from several hundred micro meters to several millimeters. The base layer 11 may be a thin (approximately 10-200 μm in thickness) and flexible film member. Materials used for the base layer 11 are not limited; however, for a multi-layered optical recording medium which is illuminated from the base layer 11 side with light to record or read out information, it is preferable that the materials have sufficient optical transparency to light used for recording/reading out the information, which light includes a recording beam, a reading beam (i.e., beam for irradiating the recording layer 12 at the time of reading out the information), and a readout beam (i.e., beam including a signal generated by irradiation of the reading beam), which are collectively referred to as a "record/readout beam" for short.

The recording layer 12 is a layer made of a recording material capable of recording information using light such as a laser beam (including ultraviolet light and infrared light). The recording layer 12 includes, as a recording material, a multi-photon absorption compound which causes a multi-photon absorption reaction such as two-photon absorption reaction and three-photon absorption reaction when irradiated with light, and a one-photon absorption compound which causes a one-photon absorption reaction when irradiated with light.

The recording material is configured to generate voids when it absorbs light. For this reason, as one example, one of or both of the multi-photon absorption material and the one-photon absorption material may use a foamable material which generates voids when the temperature thereof increases. The principle of generation of voids is not limited. For example, the multi-photon absorption material or the one-photon absorption material per se may vaporize. Alternatively, the multi-photon absorption material or the one-photon absorption material may decompose as the temperature thereof is raised, and generate voids upon decomposition.

Further, in addition to the multi-photon absorption material and the one-photon absorption material, the recording material may contain a vaporizable material which generates voids when the multi-photon absorption compound and the one-photon absorption compound absorb light and the temperature of the vaporizable material increases. In this case, the multi-photon absorption material and the one-photon absorption material may have or may not have foamable characteristics.

The size (diameter) of the voids to be generated by illumination of the recording layer 12 with light is preferably in the range of 0.01 to 10 μM, more preferably in the range of 0.05 to 5 μm, and further more preferably in the range of 0.1 to 2 μm. In other words, it is preferable that the thickness of the recording layer 12 and composition of the recording material are adjusted to generate voids within the above size range. If the size of the voids is equal to or greater than 0.01 μm, sufficiently high signal-to-noise ratio at the time of reading out the information is obtained. In the meantime, if the size of the voids is equal to or smaller than 10 μm, sufficiently high information recording density is achieved.

It is preferable that the multi-photon absorption compound undergoes a multi-photon absorption reaction in response to light having a wavelength equal to or less than 650 nm. It is also preferable that the one-photon absorption compound undergoes a one-photon absorption reaction in response to light having a wavelength equal to or less than 650 nm. In particular, the wavelength of light which causes these reactions is preferably equal to or less than 550 nm, and more preferably equal to or less than 500 nm. Accordingly, as compared to an optical information recording medium disclosed in Patent Literature 1 or Patent Literature 2, the recording beam is focused to a small-sized spot to thereby improve the recording density.

The mixture ratio of the multi-photon absorption compound and the one-photon absorption compound is not specifically limited because it depends on the absorption ratio of each compound with respect to the record/readout beam or the recording sensitivity of each compound. The mixture ratio may be determined based on experiments, which demonstrates that voids are efficiently generated while reducing the amount of the one-photon absorption compound as much as possible. For determination of the mixture ratio, it is preferable that the concentration of the one-photon absorption compound is determined to satisfy the absorption ratio in the recording layer 12 of the recording beam, which will be explained next, while the concentration of the two-photon absorption compound is as close to the solubility limit as possible to improve the recording efficiency.

It is preferable that the recording layer 12 has linear absorption ratio (of one-photon absorption) with respect to the recording beam equal to or less than 5% per one layer. Further, it is more preferable that this absorption ratio is equal to or less than 2%, and it is further more preferable that the absorption ratio is equal to or less than 1%. This is because, for example, if the intensity of the recording beam which reaches the farthermost recording layer 12 has to be equal to or greater than 50% of the intensity of the radiated recording beam, it is necessary that the absorption ratio per one recording layer is equal to or less than 2% for obtaining thirty-layered recording layers, and that the absorption ratio per one recording layer is equal to or less than 1% for obtaining fifty-layered recording layers. If the absorption ratio of each recording layer 12 is set in this range, the recording layer 12 allows one-photon absorption of the recording beam to compensate for poor multi-photon absorption efficiency, and at the same time, the amount of absorption per one layer is restricted to a moderate amount to thereby reduce the loss of the recording beam at the time of recording in deeper layers and to achieve a multi-layered structure of the recording layers 12.

Specific examples of the recording material used for the recording layer 12 will be described below.

For example, the multi-photon absorption material used for the recording layer 12 is preferably a two-photon absorption compound without having a linear absorption band at the wavelength of the reading beam.

As long as the two-photon absorption compound does not have a linear absorption band at the wavelength of the reading beam, any known two-photon absorption compound may be used; for example, compounds having a structure represented by the following formula (1) may be used.

Formula (1)

[Chem. 1]

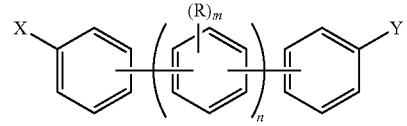

In Formula (1), each of X and Y may represent a substituent having a Hammett's sigma para-value (σp value) of 0 or more, which may be the same with or different from each other; n represents an integer of 1 to 4; R represents a substituent, and a plurality of Rs may be the same with or different from each other; and m represents an integer of 0 to 4.

In Formula (1), each of X and Y represents a group having a σp value taking a positive value in Hammett equation, i.e., what is called an electron-withdrawing group, preferably, e.g., a trifluoromethyl group, a heterocyclic group, a halogen atom, a cyano group, a nitro group, an alkylsulfonyl group, an arylsulfonyl group, a sulfamoyl group, a carbamoyl group, an acyl group, an acyloxy group, an alkoxycarbonyl group and the like, more preferably a trifluoromethyl group, a cyano group, an acyl group, an acyloxy group, and an alkoxycarbonyl group, and most preferably a cyano group and a benzoyl group. Of these substituents, an alkylsulfonyl group, an arylsulfonyl group, a sulfamoyl group, a carbamoyl group, an acyl group, an acyloxy group and an alkoxycarbonyl group may further have a substituent for various purposes including giving solubility in a solvent. The examples of the substituents include an alkyl group, an alkoxy group, an alkoxyalkyl group, an aryloxy group, etc.

n represents an integer of 1 or more and 4 or less, preferably 2 or 3, and most preferably 2. If n is 5 or more, it is said that the greater n becomes, the more the linear absorption appears at the longer wavelength side, so that non-resonant two-photon absorption recording is not done with a recording beam at a wavelength region shorter than 700 nm.

R represents a substituent. The substituent is not specifically limited, and an alkyl group, an alkoxy group, an alkoxyalkyl group, and an aryloxy group are exemplified as specific examples. m represents an integer of 0 or more and 4 or less.

The compound having the structure represented by Formula (1) is not specifically limited; for example, compounds represented by the following chemical structural formulae D-1 to D-21 may be used.

[Chem. 2]

D-1
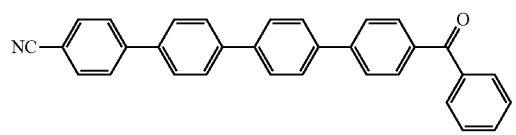

D-2
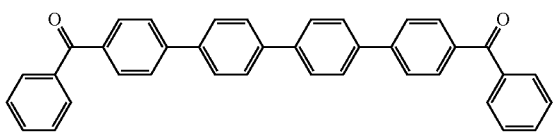

D-3
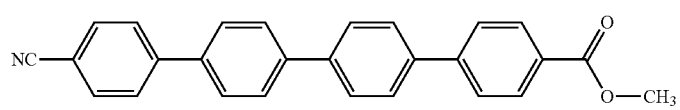

D-4
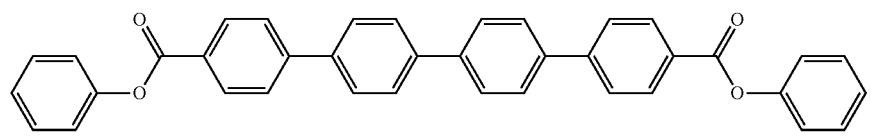

D-5
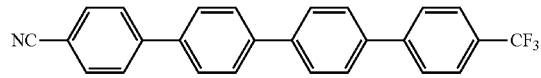

D-6
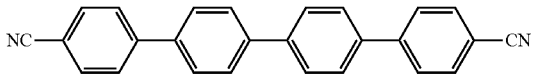

D-7
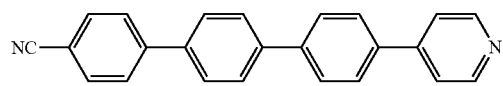

D-8
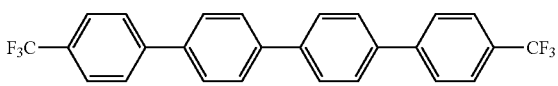

D-9
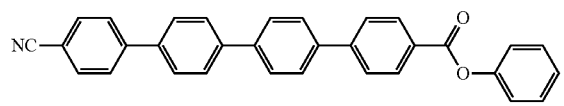

D-10
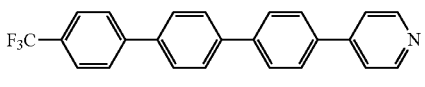

D-11
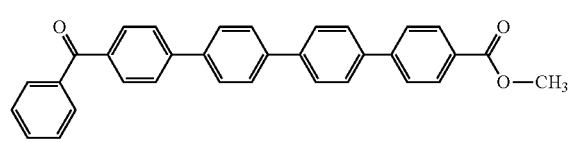

D-12
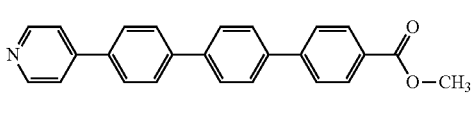

D-13
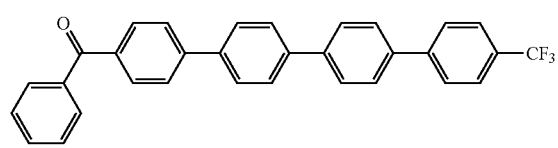

D-14
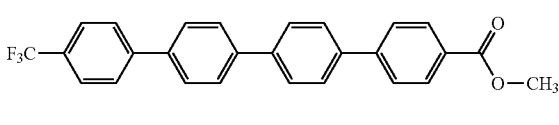

D-15
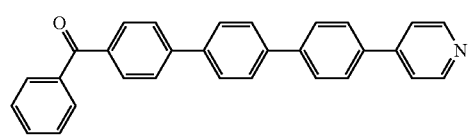

D-16
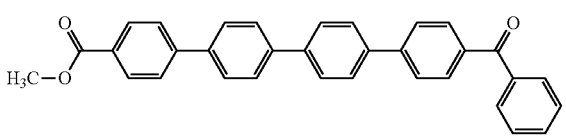

-continued

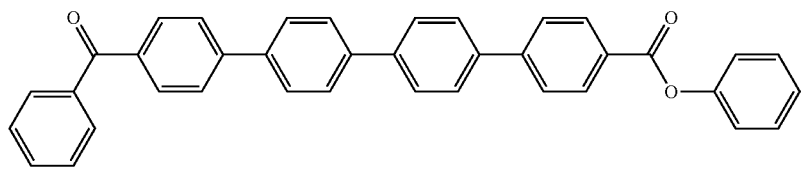

D-17

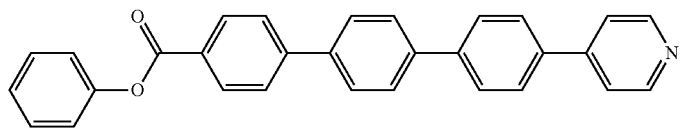

D-18

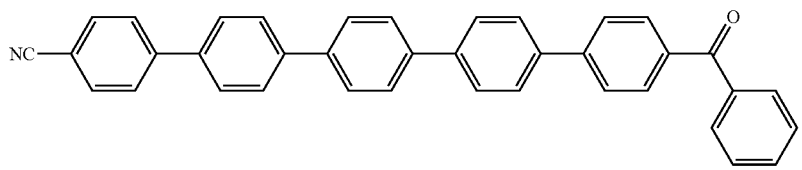

D-19

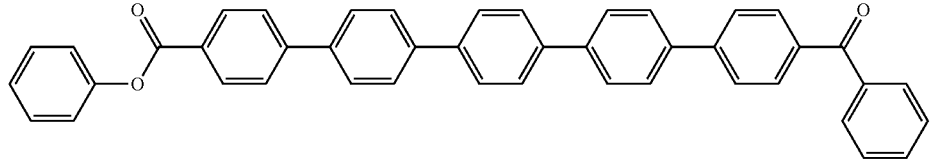

D-20

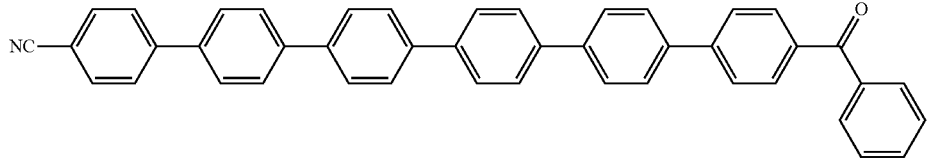

D-21

The recording material using the two-photon absorption material and having foamable characteristics may be those disclosed in Japanese laid-open patent application publication No. 2005-037658.

The one-photon absorption compound which can be used for the present invention may include dyes which have been conventionally used as a thermally deformable heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used as the one-photon absorption compound.

In addition to the multi-photon absorption compound and the one-photon absorption compound, the recording layer may comprise a vaporizable material which generates voids when the multi-photon absorption compound and the one-photon absorption compound absorb light and the temperature of the vaporizable material increases. In this instance, a nitro compound such as trinitrofluorenone (TNF) may be used as the vaporizable material.

The recording layer 12 may further include a plasticizer such as N-ethylcarbazole (ECZ), and other additives, where necessary.

The recording layer 12 is formed by dispersing the aforementioned dye in a polymer binder. Specific examples of the polymer binder may include polyvinyl acetate (PVAc), polymethylmethacrylate (PMMA), polycarbonate (PC), polystyrene (PS), and polyvinyl alcohol (PVA). Further, in order to allow erasure of information, it is preferable that the polymer binder is resin (thermoplastic resin) having a glass transition point.

The thickness of the recording layer 12 may be determined in accordance with the sensitivity of the recording material so that sufficient signal-to-noise ratio is obtained. The thickness of the recording layer 12 is in the range of 0.01 to 10 μm, preferably in the range of 0.05 to 5 μm, and more preferably in the range of 0.1 to 2 μm. For example, the thickness of the recording layer 12 may be 1 μm. If the recording layer 12 has a thickness equal to or greater than 0.01 μm, a large signal intensity is obtained for the required signal-to-noise ratio. In the meantime, if the recording layer 12 has a thickness equal to or smaller than 10 μm, a large number of recording layers 12 is provided to increase the storage capacity while retaining a sufficient thickness of each intermediate layer 13 to prevent crosstalk across the recording layers 12 (i.e., phenomenon by which a signal from one recording layer 12 is mixed with another signal from an adjacent recording layer 12).

The recording layer 12 may be formed by any conventional method; for example, a dye material and a polymer binder are dissolved in a solvent, followed by spin coating with the obtained liquid to form a recording layer 12. Examples of the solvent may include dichloromethane, chloroform, methyl ethyl ketone (MEK), acetone, and methyl isobutyl ketone (MIBK).

The number of recording layers 12 is increased to a large extent so that the multi-layered optical recording medium 10 as a whole provides a large storage capacity. As long as each intermediate layer 13 has a required thickness, the number of the recording layers 12 is increased to as many layers as possible, preferably to ten or more layers, twenty or more layers, or fifty or more layers.

The intermediate layers 13 are provided for preventing crosstalk across the adjacent recording layers 12, and the thickness thereof may be approximately in the range of 3 to 20 µm. The thickness of the intermediate layer 13 is preferably in the range of 3 to 10 µm, and more preferably in the range of 5 to 10 µm. The thinner the thickness of the intermediate layer 13, the more the number of the recording layers 12 can be increased and the storage capacity will be increased accordingly. In order to prevent crosstalk across the recording layers 12, the thickness of the intermediate layer 13 should be equal to or more than 3 µm. The intermediate layer 13 does not substantially undergo one-photon absorption and multi-photon absorption reactions to the recording beam and the reading beam, and preferably the intermediate layer 13 does not substantially undergo one-photon absorption and multi-photon absorption reactions to the readout beam as well. The term "does not substantially undergo absorption" includes the absorption ratio equal to or less than 0.05%.

The intermediate layer 13 is made, without limitation, of a material which sufficiently transmits the record/readout beam. Specific examples of this material may include: adhesives prepared by dissolving in a solvent an acrylic compound, a methacryl compound, a polyvinyl chloride compound, a polyvinyl alcohol compound, a polyvinyl acetate compound, a polystyrene compound or a polymer compound such as cellulose; light curing adhesives mainly containing an acrylate compound, an epoxy compound or an oxetane compound; hot-melt adhesives mainly containing an ethylene-vinyl acetate compound, an olefin compound or an urethane compound; and tackiness agents consisting of an acrylic compound, an urethane compound or a silicone compound.

In order to easily manufacture the multi-layer structure, materials used for the intermediate layer 13 are preferably soluble in a solvent which does not dissolve the materials used in the recording layers 12. Of these materials, transparent polymer materials not having linear absorption in the visible light region are preferable. As such materials, water-soluble polymers are preferably used.

Specific examples of the water-soluble polymers may include polyvinyl alcohol (PVA), polyvinyl pyridine, polyethyleneimine, polyethylene oxide, polypropylene oxide, polyvinyl pyrrolidone, polyacrylamide, polyacrylic acid, sodium polyacrylate, carboxymethyl cellulose, hydroxyethyl cellulose, and gelatin. Of these, PVA, polyvinyl pyridine, polyacrylic acid, polyvinyl pyrrolidone, carboxymethyl cellulose, and gelatin are preferable, and PVA is most preferable.

The cover layer 14 is provided to cover a side opposite to that at which the base layer 11 is provided. The cover layer 14 may be similar, in construction such as thickness and material, to the base layer 11. Although the base layer 11 and the cover layer 14 are referred to by different terms in this specification as a matter of convenience, the base layer 11 and the cover layer 14 may be exactly identical in construction. Alternatively, the cover layer 14 and the base layer 11 may be different in construction. For example, the thickness of the base layer 11 may be increased for increasing a support force of the base layer 11, while the thickness of the base layer 11 may be smaller than that of the base layer 11 for only protecting the side opposite to the base layer 11.

Materials used for the cover layer 14 are not limited; however, for illuminating the multi-layered optical recording medium 10 from the cover layer 14 side with light to record or read out information, it is preferable that the materials have sufficient optical transparency to the record/readout beam.

The servo layer 15 is optionally provided for tracking control of a light beam which is emitted at the time of recording or reading out information. For example, a spiral-shaped groove is formed in the servo layer 15.

Recording of information in the multi-layered optical recording medium 10 configured as described above is performed in a manner similar to that for a conventional optical disc drive, such that the laser beam, the output of which is modulated in accordance with information to be recorded, is applied to be focused on a recording layer 12 which is to be a recording target, while at least one of the multi-layered optical recording medium 10 and the laser beam is being moved relative to the other. In order to efficiently cause multi-photon absorption of the multi-photon absorption compound, it is preferable that the laser beam used for this recording may be a pulsed laser beam, the peak power of which can be increased. The output of the pulsed laser beam is preferably adjusted such that the average power is equal to or greater than 0.1 mW and the peak power is equal to or greater than 1 W.

The pulsed laser beam can be modulated by partly removing the pulsed laser beam. For this purpose, a modulator is used. Examples of such a modulator are Acousto-Optic Modulator (AOM), Mach-Zehnder (MZ) optical modulator, and other Electro-optic modulators (EOMs). The modulator is arranged on the optical path of the pulsed laser beam, and an EFM (eight-to-fourteen modulated) signal corresponding to the information to be recorded is input to the modulator. Accordingly, the pulsed laser beam can be turned on and off. When Acousto-Optic Modulator or Electro-optic modulator is used as the modulator, the light can be turned on and off at extremely higher speeds as compared to a configuration with a mechanical shutter.

When the recording layer 12 is irradiated with the modulated pulsed laser beam, a multi-photon absorption reaction in the multi-photon absorption compound and a one-photon absorption reaction in the one-photon absorption compound take place at a moment when the pulsed laser beam strikes the recording layer 12, and a void is generated. Accordingly, the information is recorded by modulation based on the presence or absence of a void.

Reading out the recorded information is performed in a manner similar to that conventionally used for a digital versatile disk (DVD) or a Blu-ray (registered trademark) disc with an optical pickup configured to emit a continuous-wave laser beam (CW laser beam), such that the multi-layered optical recording medium 10 and the laser beam are moved relatively to each other while the laser beam is directed and focused on a predetermined position of the target recording layer 12. Because the intensity of the returned light (readout beam) is different at each position depending on the presence or absence of a void, the information is decoded by demodulating the change in this intensity. The wavelength of the reading beam used for reading out the information is preferably equal to or smaller than that of the recording beam. For example, the reading beam has a wavelength equal to or smaller than 650 nm, more preferably equal to or smaller than 550 nm, and further more preferably equal to or smaller than 500 nm.

As described above, according to the multi-layered optical recording medium 10 and the recording method for the multi-layered optical recording medium 10 in this embodiment, because the recording layer 12 includes as a recording material a multi-photon absorption compound and a one-photon absorption compound, recording can be performed at a higher recording sensitivity than a multi-layered optical recording medium which only contains the multi-photon absorption compound in a recording layer. Improvement in the recording sensitivity leads to increased recording speed. Further, as compared to a multi-layered optical recording medium in which the recording layer contains the one-photon absorption material only as a recording material, it is possible to reduce the absorption ratio of the one-photon absorption compound for absorbing the recording beam, and therefore the selectivity of layers during the recording is improved and the loss of the recording beam due to the one-photon absorption is be made smaller.

To erase the information recorded in the recording layer 14, the recording layer 14 is heated to a temperature around a glass transition point of the polymer binder, preferably to a temperature higher than the glass transition point, so that the fluidity of the polymer binder can be increased and the voids are not retained in the polymer binder and thus disappear to erase the information recorded in the recording layer 14. Because the information is erasable, re-recording in the recording layer 14 (repeated recording) can be achieved. When the recording layer 14 is heated in this manner, the recording layer may be irradiated with a continuous-wave laser beam while bringing the laser beam into focus on the recording layer 14. Heating with a continuous-wave laser beam makes it possible to evenly erase the information recorded in a continuous region within the recording layer 14. The continuous-wave laser beam used may be the laser beam used for reading out the information, or alternatively, another laser beam may be used. In both cases, it is preferable that a laser beam used emits light having a wavelength absorbable by a one-photon absorption dye.

Further, when the information is to be erased by heating the recording layer 14, the optical information recording medium 10 as a whole may be heated to a temperature higher than the glass transition point of the polymer binder so that the information recorded in all the recording layers 14 can be erased at once. Accordingly, irrespective of the kind of dyes contained in the recording layer 14, all the information recorded in the optical information recording medium is easily erased for initialization. Further, when the optical information recording medium is disposed of, the information can be easily erased.

Although one exemplary embodiment of the present invention has been described above, the present invention is not limited to the above-described embodiment and various changes and modifications may be made where necessary without departing from the subject matter thereof.

For example, the multi-layered optical recording medium 10 disclosed in the above embodiment has a plurality of recording layers 12 and a plurality of intermediate layers 13 each interposed between two adjacent recording layers 12 (such a medium is referred to as a multi-layered type). However, the recording layer may consist of one relatively thick layer (such a medium is referred to as a bulk type), and the information may be recorded in a plurality of different depth positions within this one recording layer. As a matter of fact, however, a multi-layered type with one or more intermediate layers as disclosed in the above embodiment is more preferable than a bulk type. This is because although the bulk type is advantageous in view of the manufacturing cost, it is difficult to perform a focus servo operation for a plurality of recording positions (virtual recording surfaces (layers) within one recording layer). In contrast, the multi-layered type as disclosed in the above embodiment is preferable because the focus servo operation is readily and accurately performed by making use of interface reflection between a recording layer and an intermediate layer. Further, according to the multi-layered type, the thickness of the recording layer can be reduced, with the result that a recording mark thinner than a focal depth of the recording beam can be recorded. This is advantageous for reading out the recording mark. Further, assuming that the amounts of absorption of the one-photon absorption compound are constant in the thickness direction of a single recording medium, the multi-layered type does not require a one-photon absorption dye at intermediate layers. Therefore, the amount (concentration) of absorption of the one-photon absorption compound contained in the recording layer is enhanced accordingly, which is advantageous for improvement of the recording efficiency.

EXAMPLE

Description will be given of experiments for recording on and erasing from an optical information recording medium according to the present invention.

Example 1

1. Recording Material

The following materials are used for preparing a recording material:

| Solvent | methyl ethyl ketone (MEK) | 7.0 g |
| Two-photon absorption dye | following compound D-1 | 70 mg |

[Chem. 3]

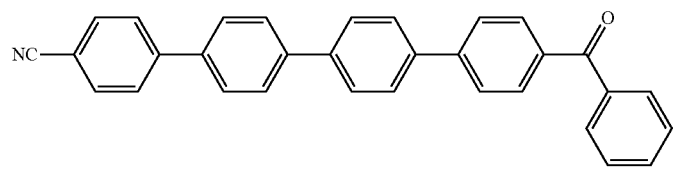

D-1

| One-photon absorption dye [Chem. 4] | following azo-metal complex dyes 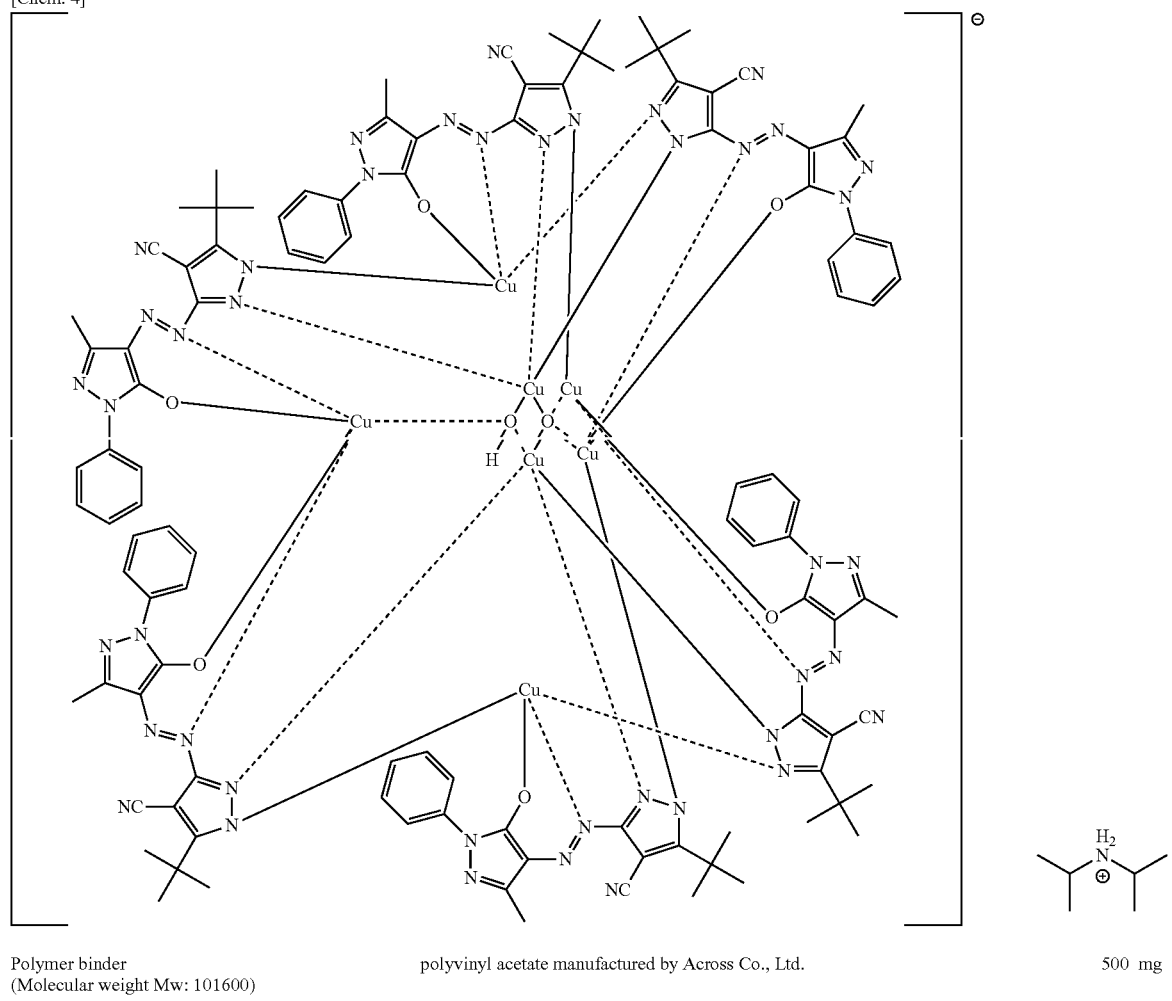 | M-11 | 15 mg |
|---|---|---|---|
| Polymer binder (Molecular weight Mw: 101600) | polyvinyl acetate manufactured by Across Co., Ltd. | | 500 mg |

The synthesis process for the above M-11 will be briefly described. Azo-metal complex dyes (M-11) is made from the following azo dyes (L-11).

[Chem. 5]

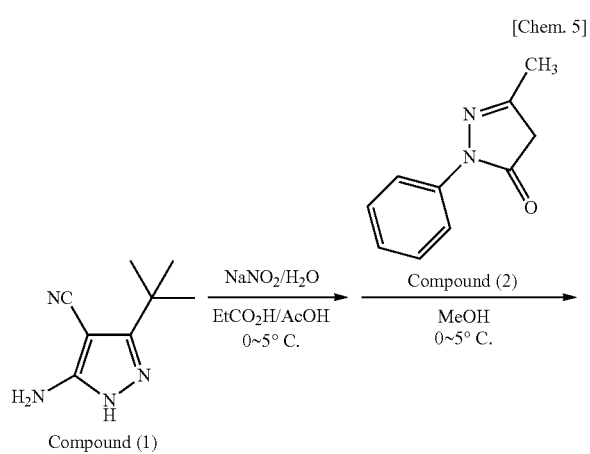

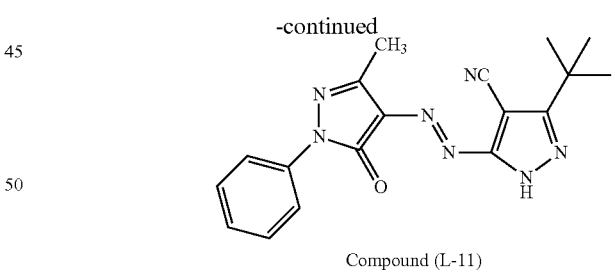

Compound (L-11)

[Synthesis of Compound (M-11)]

120 g of compound (L-11) and 1200 ml of methanol were put into a 3-1 three-necked flask, and 193 ml of diisopropylamine was added thereto dropwise with stirring. After complete dissolution of the mixture, 82.3 g of cupric acetate monohydrate was further added with stirring and reacted at a temperature of 60 to 65° C. for 2 hours. The mixture was cooled to the room temperature and subjected to filtration to isolate the precipitates. The precipitates were washed with methanol, and dried to obtain 117 g of a compound (M-11).

2. Formation of Recording Layer

A two-photon absorption dye, a one-photon absorption dye, and a polymer binder were dissolved in the above solvent while stirring to obtain a coating liquid. The coating liquid was applied to a glass substrate by spin coating to form a film on the glass substrate. The thickness of the film was 1 μm. It should be noted that the two-photon absorption dye as described above does not have liner absorption at the wavelength (522 nm) of a recording beam. The absorption ratio (one-photon absorption) of the produced recording layer with respect to the recording beam for the one-photon absorption dye was 1.8%.

3. Estimation

The recording layer was irradiated with a recording beam (pulsed laser: wavelength of 522 nm, repetition frequency of 3 GHz, pulse width of 500 fsec, average power Pa of 5-50 mW, and peak power Pp of 3-33 W) with the peak power of 10 W.

With respect to the recording layer, the focal position of the recording beam was moved in the optical axis direction by 0.4 μm increments from 0.4 to 4 μm (i.e., 11 points in the depth direction), and a test was performed for four points each including these 11 focal positions, namely the total of 44 recording positions were tested.

Recording conditions were adjusted by changing the recording time from 5 μs to 5 ms. The recording time [μs] required for recording 12 recording marks (i.e., 3 points at adjacent focal positions in each depth direction times the four points) was measured to obtain data.

Comparative Example 1

Unlike the above Example 1, a recording layer was produced using a one-photon absorption dye and a polymer binder without adding a two-photon absorption dye. The amount of the materials used and other conditions were the same as those described in Example 1.

Comparative Example 2

Unlike the above Example 1, a recording layer was produced using a two-photon absorption dye and a polymer binder without adding a one-photon absorption dye. The amount of the materials used and other conditions were the same as those described in Example 1.

Comparative Example 3

Unlike the above Example 1, a recording layer was produced using a polymer binder without adding a two-photon absorption dye and a one-photon absorption dye. The amount of the materials used and other conditions were the same as those described in Example 1.

[Results]

The following table shows comparisons of the experimental results such as time required for formation of the predetermined number of voids.

The above Table 1 shows that the recording time was shortened to one-third in Example 1 as compared to an optical information recording medium without containing a two-photon absorption dye (Comparative example 1) and shortened to one-eighteenth in Example 1 as compared to an optical information recording medium without containing a one-photon absorption dye (Comparative example 2). In other words, these experiments reveal that the optical information recording medium according to the present invention provides a high recording sensitivity and thus increase the recording speed. It should be noted that recording was not made (i.e., voids were not formed) on the recording layer where a two-photon absorption dye and a one-photon absorption dye were not contained and only a polymer binder was present.

[Erasing Records]

The optical information recording medium with recording marks formed by voids in Example 1 was heated for one hour at 80° C. using an oven. The recording marks made from the voids disappeared, which showed that the records were erasable.

What is claimed is:

1. An optical information recording medium comprising:
    a recording layer comprising a multi-photon absorption compound and a one-photon absorption compound; and
    a supporting member configured to support the recording layer,
    wherein absorption of multiple photons by the multi-photon absorption compound and absorption of one photon by the one-photon absorption compound cause a void to be generated in the recording layer, whereby information is recordable by modulation based on a presence or absence of a void,
    wherein the recording layer comprises a plurality of recording layers, wherein the optical information recording medium further comprises an intermediate layer provided between each of two adjacent recording layers, the intermediate layer being unreactive, with respect to one-photon absorption and multi-photon absorption, to irradiation of a recording beam for recording information and irradiation of a reading beam for reading out the information, and
    wherein the plurality of recording layers have an absorption ratio of one-photon absorption for the recording beam equal to or less than 5% per one layer.

2. The optical information recording medium according to claim 1, wherein at least one of the multi-photon absorption compound and the one-photon absorption compound is a foamable material which generates a void when it absorbs light and temperature thereof increases.

3. The optical information recording medium according to claim 1, wherein in addition to the multi-photon absorption compound and the one-photon absorption compound, the recording layer comprises a vaporizable material which gen-

TABLE 1

| | Example 1 | C. Example 1 | C. Example 2 | C. Example 3 |
|---|---|---|---|---|
| Two-photon absorption dye | Contained | None | Contained | None |
| One-photon absorption dye | Contained | Contained | None | None |
| Polymer binder | Contained | Contained | Contained | Contained |
| Absorbance (λ = 522 nm) | 0.008 | 0.008 | 0 | 0 |
| Absorption ratio (λ = 522 nm) | 1.8% | 1.8% | 0.0% | 0.0% |
| Recording time [μsec] | 5 | 15 | 90 | Unrecordable |
| Relative recording time | 1 | 3 | 18 | — | erates a void when the multi-photon absorption compound and the one-photon absorption compound absorb light and temperature of the vaporizable material increases.

4. The optical information recording medium according to claim 1, wherein the recording layer comprises a polymer binder, and wherein voids in the recording layer are erasable by heating.

5. The optical information recording medium according to claim 1, wherein the size of voids to be generated is in the range of 0.01 to 10 μm.

6. The optical information recording medium according to claim 1, wherein the thickness of the recording layer is in the range of 0.01 to 10 μm.

7. A method for erasing information recorded in an optical information recording medium of claim 4, comprising the step of:
    heating the recording layer, whereby the information recorded in the recording layer is erased.

8. The information erasing method according to claim 7, wherein the recording layer is heated by being irradiated with a continuous-wave laser beam focused on the recording layer.

9. The information erasing method according to claim 7, wherein the optical information recording medium as a whole is heated, whereby all the information recorded in the recording layer is erased.

10. A method for recording optical information in an information recording medium, which comprises a recording layer including a multi-photon absorption compound and a one-photon absorption compound, and a supporting member configured to support the recording layer, the method comprising the step of:
    illuminating the recording layer with a pulsed laser beam modulated in accordance with information to be recorded in the recording layer, so as to cause a multi-photon absorption reaction in the multi-photon absorption compound and a one-photon absorption reaction in the one-photon absorption compound to take place to generate voids at positions determined corresponding to the modulation, whereby the information is recorded by modulation based on a presence or absence of a void,
    wherein the recording layer comprises a plurality of recording layers, wherein the optical information recording medium further comprises an intermediate layer provided between each of two adjacent recording layers, the intermediate layer being unreactive, with respect to one-photon absorption and multi-photon absorption, to irradiation of a recording beam for recording information and irradiation of a reading beam for reading out the information, and
    wherein the plurality of recording layers have an absorption ratio of one-photon absorption for the recording beam equal to or less than 5% per one layer.

* * * * *